United States Patent
Baldauf et al.

(10) Patent No.: US 7,766,616 B2
(45) Date of Patent: Aug. 3, 2010

(54) TURBINE BLADE FOR A GAS TURBINE, USE OF A TURBINE BLADE AND METHOD FOR COOLING A TURBINE BLADE

(75) Inventors: Stefan Baldauf, München (DE); Michael Händler, Erkrath (DE); Christian Lerner, Herten (DE)

(73) Assignee: Siemens Aktiengesellschaft, Munich (DE)

( * ) Notice: Subject to any disclaimer, the term of this patent is extended or adjusted under 35 U.S.C. 154(b) by 690 days.

(21) Appl. No.: 11/791,095

(22) PCT Filed: Nov. 7, 2005

(86) PCT No.: PCT/EP2005/055779
§ 371 (c)(1),
(2), (4) Date: May 17, 2007

(87) PCT Pub. No.: WO2006/056525
PCT Pub. Date: Jun. 1, 2006

(65) Prior Publication Data
US 2008/0124225 A1    May 29, 2008

(30) Foreign Application Priority Data
Nov. 23, 2004   (EP)   ................................. 04027789

(51) Int. Cl.
*F01D 5/08*    (2006.01)
(52) U.S. Cl. .................. 416/1; 416/232; 416/236 R; 416/97 R

(58) Field of Classification Search ............ 416/95, 416/97 R, 232, 236 R, 236 A, 1
See application file for complete search history.

(56) References Cited

U.S. PATENT DOCUMENTS

| | | | | |
|---|---|---|---|---|
| 4,720,239 A | * | 1/1988 | Owczarek | 415/181 |
| 5,243,759 A | * | 9/1993 | Brown et al. | 29/889.721 |
| 5,337,568 A | * | 8/1994 | Lee et al. | 416/236 R |
| 6,183,197 B1 | | 2/2001 | Bunker et al. | |
| 6,328,531 B1 | | 12/2001 | Bariaud et al. | |

FOREIGN PATENT DOCUMENTS

| | | |
|---|---|---|
| DE | 862 691 | 4/1952 |
| DE | 1 601 613 | 12/1970 |
| EP | 1 369 554 A1 | 12/2003 |
| JP | 2001098903 A | 4/2001 |
| JP | 2003138905 A | 5/2003 |

* cited by examiner

*Primary Examiner*—Igor Kershteyn

(57) ABSTRACT

There is described a turbine blade of a gas turbine comprising a suction-side blade wall and a pressure-side blade wall that, in the trailing edge area, runs toward the suction-side blade wall. This suction-side blade wall has a trailing edge projection projecting over the end edge of the pressure-side blade wall at least in a partial section of the trailing edge area. A turbine blade of the aforementioned type is designed for a particularly long serviceable life while requiring little cooling air. To this end, the pressure-side surface of the trailing edge projection has a number of trough-shaped recesses that increase the transfer of heat from the trailing edge projection by a local swirling of the cooling air.

19 Claims, 2 Drawing Sheets

US 7,766,616 B2

TURBINE BLADE FOR A GAS TURBINE, USE OF A TURBINE BLADE AND METHOD FOR COOLING A TURBINE BLADE

CROSS REFERENCE TO RELATED APPLICATIONS

This application is the US National Stage of International Application No. PCT/EP2005/055779, filed Nov. 7, 2005 and claims the benefit thereof. The International Application claims the benefits of European application No. 04027789.9 DE filed Nov. 23, 2004, both of the applications are incorporated by reference herein in their entirety.

FIELD OF INVENTION

The invention relates to a turbine blade for a gas turbine. It relates, furthermore, to a gas turbine with a turbine blade of this type and to a method for cooling a turbine blade.

BACKGROUND OF INVENTION

Gas turbines are employed in many areas for driving generators or working machines. In this context, the energy content of a fuel is utilized for generating a rotational movement of a turbine shaft. The fuel is burnt in a number of burners for this purpose, air compressed by an air compressor being supplied. Owing to the combustion of the fuel, a working medium which is under high pressure and which has a high temperature is generated. This working medium is routed into a following turbine unit where it expands so as to perform work.

The turbine unit of a gas turbine has, for the pulse transmission of the working medium to the turbine shaft, a number of rotatable moving blades which are connected to the turbine shaft. For this purpose, the moving blades are arranged in a ring on the turbine shaft and thus form a number of moving blade rings or moving blade rows. The turbine and the compressor are arranged on a common turbine shaft, also designated as a turbine rotor, to which the generator or the working machine is also connected and which is mounted rotatably about its center axis.

Furthermore, the turbine unit usually comprises a number of stationary guide blades which are likewise fastened in a ring to an inner casing or the stator of the turbine so as to form guide blade rings or guide blade rows. The moving blades in this case serve for driving the turbine shaft by pulse transmission from the working medium flowing through the turbine. By contrast, the guide blades serve for routing the flow of the working medium in each case between two moving blade rows or moving blade rings which follow one another, as seen in the flow direction of the working medium. A successive pair consisting of a ring of guide blades or a guide blade row and of a ring of moving blades or a moving blade row is in this case also designated as a turbine stage.

A guide blade, as a rule, has a platform, designated as a blade root, which is arranged as a wall element for fixing the respective guide blade to the inner casing of the turbine and which forms the outer boundary of a hot-gas duct for the working medium flowing through the turbine. For an efficient flow routing of the working medium in the direction of the moving blade row following a guide blade row, a guide blade assigned to the guide blade row conventionally has a curved wing-shaped cross-sectional profile, so that the intended flow routing is established, with frictional losses on the respective guide blade being kept as low as possible, and therefore the guide blade row or the turbine stage assigned to it possesses as high efficiency as possible. For this purpose, the leading edge of a guide blade has a round cross section which narrows toward the tapering trailing edge of the guide blade. A moving blade is similarly shaped, as a rule specific details, such as, for example, the maximum profile thickness, the radius of curvature at the leading edge, etc., being adapted to the application, that is to say being optimized for a particularly efficient pulse transmission from the working medium to the respective moving blade.

In the design of gas turbines described above, particularly high efficiency is usually a design aim in addition to the achievable power. An increase in efficiency can in this case basically be achieved, for thermodynamic reasons, by an increase in the temperature at which the working medium flows out from the combustion chamber and into the turbine unit. Temperatures of about 1200° C. to 1500° C. for gas turbines of this type are therefore aimed at and even achieved.

With such high temperatures of the working medium, however, the components and structural parts exposed to this medium are exposed to high thermal loads. In order nevertheless to ensure a comparatively long service life of the relevant components with a high degree of reliability, it is normally necessary to cool the respective components, in particular the turbine blades. In order to prevent thermal distortions of the material, which limit the service life of the components, the aim, as a rule, is to achieve as uniform a cooling of the components as possible. The coolant used is in this case normally cooling air to which the heat of the structural parts to be cooled is transmitted. In this case, in what is known as impact cooling, the cooling air can be conducted essentially perpendicularly onto a surface to be cooled, or, in what is known as film cooling, it can be led along the surface to be cooled, that is to say essentially tangentially with respect to the latter. Furthermore, for the convective cooling of turbine components, cooling-air ducts integrated into these may be provided. Finally, the various cooling concepts may also be combined with one another.

To cool the turbine blades, in particular the guide blades, which are subjected to particularly high thermal load, cooling air is usually conducted into their interior, so that the walls of the respective turbine blade are cooled from inside. At least some of this cooling air is blown out of the blade interior through outlet ports from the trailing edge of the turbine blade rearwardly in the flow direction of the working medium. In order to configure the trailing edge in an aerodynamically beneficial way or to make it possible to have an effective cooling of the comparatively slender trailing edge by the blown-out cooling air, with the aerodynamically particularly beneficial contour being maintained on the suction side of the blade leaf the delivery-side blade wall originally converging in a wedge-shaped manner in the trailing edge region with the suction-side blade wall is cut back to an extent such that that portion of the suction-side blade wall which projects beyond the end edge of the delivery-side blade wall forms what is known as a trailing edge tab of small thickness. This trailing edge configuration is also designated as a cut-back trailing edge. Depending on production, other designations are also common, such as, for example, pressure side bleed. The trailing edge tab is cooled by means of film cooling by the cooling air flowing out from the gap between the end edge of the delivery-side blade wall and the trailing edge tab of the suction-side blade wall. The free-standing portions of the trailing edge tab are interrupted by stiffening portions or webs, also designated as land, in which, to stabilize the turbine blade in the trailing edge region, the delivery-side blade wall is extended in each case as far as the trailing edge end, so that the trailing edge is maintained with a comparatively high mass there.

The problem, here, is that, despite the described cooling of the trailing edge tab, type-induced overheating may occur in this region. In particular, crack formation caused thereby has the effect of limiting the service life of the respective turbine blade. Since, in the maintenance work necessary for eliminating such wear damage, mostly large parts of the gas turbine or of the respective turbine unit have to be demounted and subsequently reassembled, relatively long shutdown times also occur in addition to the costs for the procurement and installation of the replacement parts. Although the erosion of the turbine blades, particularly in the region of their respective trailing edge, can be counteracted by the increased use of cooling air, this nevertheless reduces the overall efficiency of the gas turbine.

SUMMARY OF INVENTION

An object on which the invention is based is, therefore, to specify a turbine blade for a gas turbine, which, along with a low cooling air requirement, has a particularly long service life. A further object is to specify a use of such a turbine blade. Moreover, a method for cooling a turbine blade is to be specified.

As regards the turbine blade, the object is achieved, according to the invention, in that the delivery-side surface of the trailing edge tab has a number of trough-shaped depressions.

The invention in this case proceeds from the consideration that, in the region of the trailing edge tab, the working medium or hot gas flowing along the delivery side is intermixed with the cooling air flowing out from the blade interior, so that precisely the trailing edge tab which is particularly sensitive because of its slender form of construction is exposed to comparatively warm cooling air with a correspondingly reduced cooling capacity. As a result, an overheating of the trailing edge end may occur, which leads possibly to crack formations and consequently to a diminished service life of the respective turbine blade. Furthermore, the invention proceeds from the consideration that an increased use of cooling air should be dispensed with in the interests of a high efficiency of the gas turbine. Instead, the arrangement for cooling the trailing edge region should be configured in such a way that the cooling potential, remaining after the intermixing with the hot working medium, of the cooling air present is utilized as fully as possible. For this purpose, the heat transition from the trailing edge or the trailing edge tab to the hot-gas/cooling-air mixture flowing along should be increased.

In this case, suitable elements on the trailing edge tab should be configured in such a way that, on the one hand, a flow influencing or swirling of the hot-gas/cooling-air mixture flowing tangentially along the trailing edge tab occurs, which gives rise to increased heat transition. On the other hand, however, this flow influencing should be designed in such a way that no breakaway or no deflection of the cooling film from the surface to be cooled takes place. For this purpose, trough-shaped depressions, what are known as dimples, are provided, which increase the turbulence of the cooling film flowing along the trailing edge tab, but do not lead to its deflection from the trailing edge surface. In this case, the dischargeable heat quantity rises, while an undesirable pressure loss is avoided. These depressions are in this case configured such that they have in each case a boundary edge running around solely in the delivery-side surface of the trailing edge tab.

Advantageously, a number of the depressions introduced into the trailing edge tab have in each case an elliptic, in particular circular boundary edge. In a particularly suitable design variant which, as compared with a smooth trailing edge tab, brings about only an extremely insignificant increase in the flow resistance, a boundary of this type is brought about in that the respective depression possesses the configuration of a spherical segment.

For a suitable adaption of the depressions to the velocity and the throughput quantity of the working-medium/cooling-air mixture flowing along on the trailing edge and to the size of the turbine blade, the radius amounts preferably to about $1/10$ to $1/4$ of the width of the trailing edge tab in the case of a depression having a circular boundary. The (maximum) depth of a spherical segment advantageously corresponds approximately to $1/3$ of the corresponding sphere radius. Depressions with a boundary deviating slightly from the circular shape, for example an elliptic boundary with slight eccentricity, are preferably dimensioned similarly in terms of their depth and their planar extent to the depressions with a circular boundary or with a configuration in the form of a spherical segment.

For a particularly uniform influencing of the working-medium/cooling-air mixture flowing along, the depressions are preferably distributed regularly on the delivery-side surface of the trailing edge tab, the distance between the boundaries of two adjacent depressions in each case which have a configuration in the form of a spherical segment amounting preferably to once to one-and-a-half times the sphere diameter.

According to the invention, the present turbine blade, the trailing edge tab of which has trough-shaped depressions, is used in a preferably stationary gas turbine in order to achieve the object directed at specifying a use of the abovementioned turbine blade. In particular, the turbine blade may be a guide blade. Preferably, in each case, a number of these guide blades are combined in a number of guide blade rows. The same applies correspondingly to moving blades. In particular, a gas turbine equipped with conventional turbine blades may be retrofitted, to increase its efficiency, with the turbine blades which are improved in terms of the trailing edge cooling.

As regards the method, the object is achieved in that cooling air flowing along the trailing edge tab is swirled locally by depressions arranged on the trailing edge tab.

The advantages achieved by means of the invention are, in particular, that, in a turbine blade with what is known as a cut-back trailing edge, an improved heat transition to the cooling air flowing past is achieved by the directed application of a surface structure to the delivery-side surface of the trailing edge tab with a large number of comparatively small and shallow troughs (dimples), in a similar way to the surface of a golf ball. As a result, in this particularly critical region, the thermal load can be lowered and consequently damage to the trailing edge end can be avoided or at least slowed down, so that the trailing edge end or the assigned turbine blade has a longer service life and/or can be operated at higher temperatures. Since, furthermore, owing to the dimples, the flow resistance is not increased, as compared with the turbine blade having a smooth trailing edge tab, and therefore the cooling air jet or the working medium does not experience any pressure loss, the aerodynamic performance data of the turbine blade thus being maintained, an increased overall efficiency of the respective turbine unit can also be achieved because of the saving of cooling air. With an appropriate configuration of the casting mold, the surface structure can be introduced directly into the casting of the turbine blade at comparatively low outlay.

BRIEF DESCRIPTION OF THE DRAWINGS

An exemplary embodiment of the invention is explained in more detail with reference to a drawing in which.

DETAILED DESCRIPTION OF INVENTION

Identical parts are given the same reference symbols in all the figures.

Figure 1:
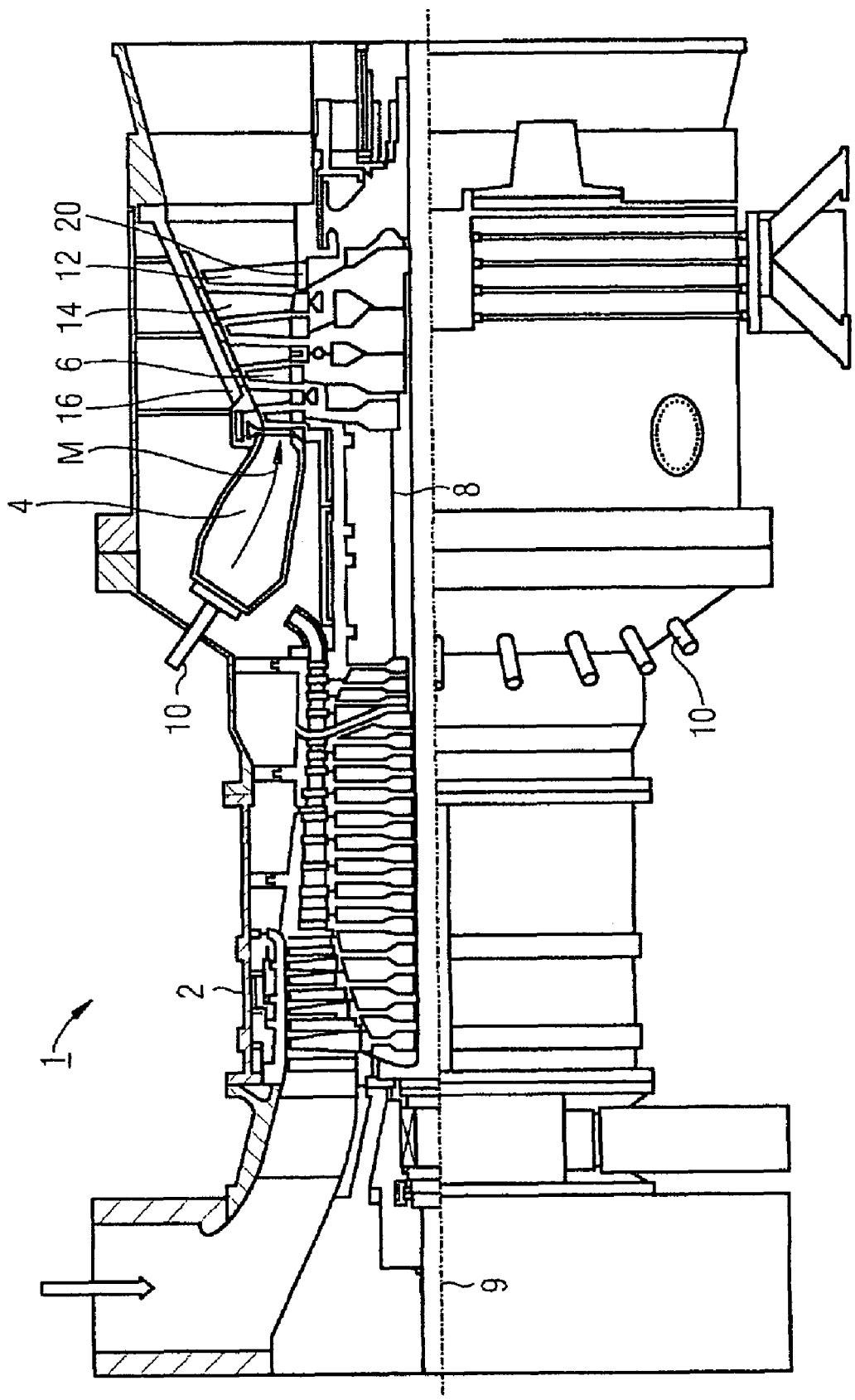
FIG. 1 shows a longitudinal section through a gas turbine.

The gas turbine 1 according to FIG. 1 has a compressor 2 for combustion air, a combustion chamber 4 and a turbine 6 for the drive of the compressor 2 and of a generator or working machine, not illustrated. For this purpose, the turbine 6 and the compressor 2 are arranged on a common turbine shaft 8, also designated as a turbine rotor, to which the generator or the working machine is also connected and which is mounted rotatably about its center axis 9.

The combustion chamber 4 designed in the manner of an annular combustion chamber is equipped with a number of burners 10 for the combustion of a liquid or gaseous fuel. It is provided, furthermore, on its inner wall with heat shield elements, not illustrated in any more detail.

The turbine 6 has a number of rotatable moving blades 12 connected to the turbine shaft 8. The moving blades 12 are arranged in a ring on the turbine shaft 8 and thus form a number of moving blade rows. Furthermore, the turbine 6 comprises a number of stationary guide blades 14 which are likewise fastened in a ring to an inner casing 16 of the turbine 6 so as to form guide blade rows. The moving blades 12 in this case serve for driving the turbine shaft 8 by push transmission from the working medium M flowing through the turbine 6. The guide blades 14, by contrast, serve for the flow routing of the working medium M in each case between two successive moving blade rows or moving blade rings, as seen in the flow direction of the working medium M. A successive pair of a ring of guide blades 14 or a guide blade row and of a ring of moving blades 12 or a moving blade row is in this case also designated as a turbine stage.

Each guide blade 14 has a platform 18, also designated as a blade root, which is arranged as a wall element for fixing the respective guide blade 14 to the inner casing 16 of the turbine 6. The platform 18 is in this case a component which is subjected to comparatively high thermal load and which forms the outer boundary of the hot-gas duct for the working medium M flowing through the turbine 6. Each moving blade 12 is fastened in a similar way to the turbine shaft 8 via a platform 20, also designated as a blade root.

To achieve a comparatively high efficiency, the gas turbine 1 is designed for a comparatively high outlet temperature of the working medium M flowing out of the combustion chamber 4 of about 1200° C. to 1500° C. In order in this case also to ensure a long service life or operating time of the gas turbine 1, its essential components, in particular the turbine blades 15 (that is to say, the guide blades 14 and/or the moving blades 12) are designed to be coolable.

To cool a turbine blade 15, in particular a guide blade 14, cooling air K is used which is conducted into the interior of the turbine blade 15 in order, in particular, to cool the outer walls from inside. Some of this cooling air K is blown out of the outlet ports of the turbine blade 15 which are arranged on the end face, in order to cool the particularly heat-sensitive trailing edge region 21 having the trailing edge 22.

Figure 2:
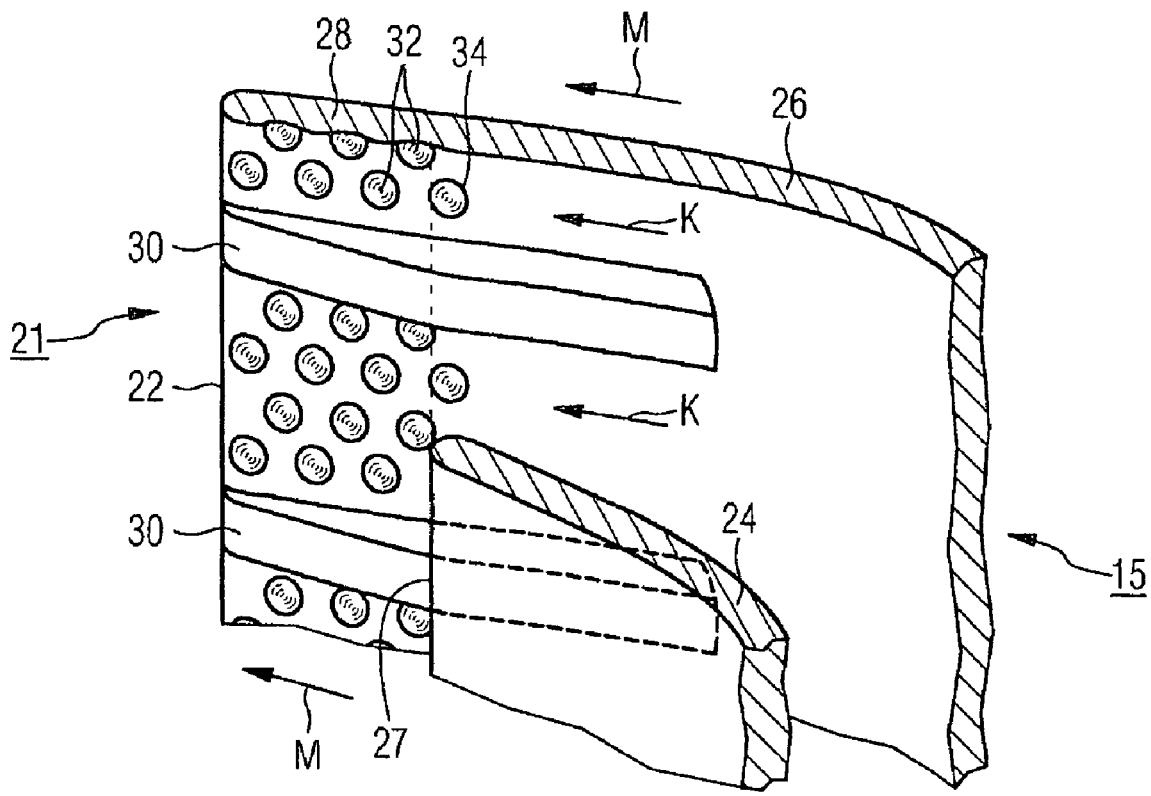
FIG. 2 shows a partly sectional side view of a turbine blade of the gas turbine according to FIG. 1.
Figure 3:
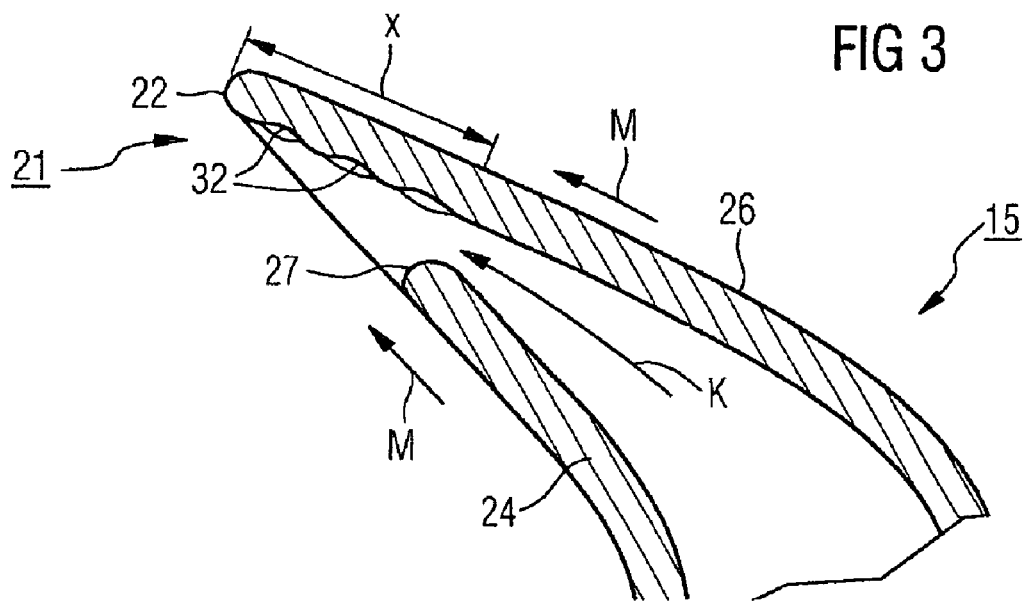
FIG. 3 shows a detail from the cross section of the turbine blade according to FIG. 2.

For a more detailed explanation of the cooling system of the turbine blades 15 in the region of the trailing edge 22, therefore, FIGS. 2 and 3 illustrate a turbine blade 15, FIG. 2 showing a partly sectional side view of the turbine blade 15 and FIG. 3 showing a cross section through the blade profile. As may be gathered from the figures, the working medium M flows around the turbine blade 15 on both sides in the direction of the trailing edge 22, the blade profile being delimited with respect to the working medium M by the delivery-side blade wall 24 and the delivery-remote or suction-side blade wall 26. For a configuration of the trailing edge region 21 which, along with higher dynamic efficiency, is also suitable for cooling, the turbine blade 15 has what is known as a cut-back trailing edge, in which the delivery-side blade wall 24 is set back from the trailing edge 22 in such a way that the suction-side blade wall 26 forms a trailing edge tab 28 projecting beyond the end edge 27 of the delivery-side blade wall 24. These portions with a free-standing trailing edge tab 28 exposed to the working medium M on both sides are interrupted only by the stiffening elements 30 having a stabilizing action, the trailing edge region 21 in these land portions, as they are known, being formed jointly with the delivery-side blade wall 24 prolonged as far as the trailing edge 22. However, variants with shortened or nontapering land portions may also be envisaged.

At this cut-back trailing edge, the trailing edge tab 28 or the delivery-remote or suction-side blade wall 26 is cooled by a cooling film of cooling air K which emerges from the interior of a turbine blade 15. In this case, the cooling air K is intermixed in the region of the trailing edge tab 28 with the working medium M flowing in on the delivery side, so that the temperature of the cooling film flowing along the inside of the delivery-remote blade wall 26 rises continuously in the region of the trailing edge tab 28.

In order to prevent this causing an overheating of the trailing edge tab 28 of the turbine blade 15 which may lead to cracks, the trailing edge tab 28 is designed specifically for particularly effective heat transfer to the cooling air K already preheated as a result of contact with the hot working medium M. For this purpose, a number of trough-shaped depressions 32 are provided on the delivery-facing side of the trailing edge tab 28. These generate swirling within the cooling air layer, without causing a breakaway or displacement of the latter from the trailing edge tab, with the result that increased heat transmission from the trailing edge tab 28 to the cooling film can be achieved. Consequently, with the pressure loss kept low, an increased cooling action becomes possible.

The depressions 32 are configured such that their respective peripheral boundary edge 34 is provided solely in the delivery-side surface of the trailing edge tab 28. In the exemplary embodiment, the depressions 32 in each case possess the configuration of a spherical segment. They therefore have a circular boundary edge 34 with a radius of about 1/10 of the width X of the trailing edge tab 28. The depth of a spherical segment corresponds approximately to 1/3 of the sphere radius. Consequently, a good capacity for influencing the air flow is ensured, while the mechanical stability of the trailing edge tab 28 is at most insignificantly reduced. The depressions 32 form a regular pattern, so that the cooling effect described takes effect uniformly over the entire delivery-side surface of the trailing edge tab 28 (with the exception of the portions which are interrupted by stiffening elements 30 and which are designed in any case to higher thermal loads). In order to achieve a particularly uniform cooling effect, even the depressions 32 which are predetermined by the pattern, but, because of the lack of space at the end of the trailing edge tab 28, no longer fit completely onto the remaining surface, are incorporated.

The invention claimed is:

1. A turbine blade for a gas turbine, comprising:
    a suction-side blade wall;
    a delivery-side blade wall tapering toward the suction-side blade wall in a trailing edge region;
    a trailing edge tab projecting beyond an end edge of the delivery-side blade wall at least in a portion of the trailing edge region, wherein the suction-side blade wall comprises the trailing edge tab; and
    a plurality of through-shaped depressions at the delivery-side surface of the trailing edge tab, wherein the depressions have a boundary edge in the delivery-side surface of the trailing edge tab.

2. The turbine blade as claimed in claim 1, wherein the depressions have an elliptic boundary edge.

3. The turbine blade as claimed in claim 1, wherein the depressions have a circular boundary edge.

4. The turbine blade as claimed in claim 3, wherein the depressions have the configuration of a spherical segment.

5. The turbine blade as claimed in claim 3, wherein a radius of the circular boundary edge is $\frac{1}{10}$ to $\frac{1}{4}$ of a width of the trailing edge tab.

6. The turbine blade as claimed in claim 4, wherein a radius of the circular boundary edge is $\frac{1}{10}$ to $\frac{1}{4}$ of a width of the trailing edge tab.

7. The turbine blade as claimed in claim 4, wherein a depth of the spherical segment is essentially $\frac{1}{3}$ of the sphere radius.

8. The turbine blade as claimed in claim 6, wherein a depth of the spherical segment is essentially $\frac{1}{3}$ of the sphere radius.

9. The turbine blade as claimed in claim 6, wherein the depressions are arranged regularly.

10. The turbine blade as claimed in claim 4, wherein the depressions are regularly arranged and of the same dimension, and wherein a distance between the boundary edges of adjacent depressions is one to one-and-a-half of a sphere diameter.

11. The turbine blade as claimed in claim 10, wherein depressions at a end of the trailing edge tab are predetermined by the pattern and fitted partly onto a remaining surface of the trailing edge.

12. The turbine blade as claimed in claim 1, wherein the turbine blade has stiffening elements.

13. A method for cooling a turbine blade, comprising:
    providing a turbine blade having:
        a suction-side blade wall,
        a delivery-side blade wall tapering toward the suction-side blade wall in a trailing edge region,
        a trailing edge tab projecting beyond an end edge of the delivery-side blade wall at least in a portion of the trailing edge region, wherein the suction-side blade wall comprises the trailing edge tab, and
        a plurality of through-shaped depressions at the delivery-side surface of the trailing edge tab, wherein the depressions have a boundary edge in the delivery-side surface of the trailing edge tab;
    providing a cooling air flowing along the trailing edge tab swirled locally by depressions arranged on the trailing edge tab.

14. The method for cooling a turbine blade as claimed in claim 13, wherein:
    the depressions form a regular pattern to form a uniformly cooling effect over the entire delivery-side surface of the trailing edge tab interrupted by stiffening elements.

15. A gas turbine, comprising:
    a plurality of turbine blades, wherein at least one of the turbine blades has:
        a suction-side blade wall,
        a delivery-side blade wall tapering toward the suction-side blade wall in a trailing edge region,
        a trailing edge tab projecting beyond an end edge of the delivery-side blade wall at least in a portion of the trailing edge region, wherein the suction-side blade wall comprises the trailing edge tab, and
        a plurality of through-shaped depressions at the delivery-side surface of the trailing edge tab, wherein the depressions have a boundary edge in the delivery-side surface of the trailing edge tab.

16. The turbine blade as claimed in claim 15, wherein the depressions have an elliptic boundary edge.

17. The turbine blade as claimed in claim 15, wherein the depressions have a circular boundary edge.

18. The turbine blade as claimed in claim 17, wherein the depressions have a configuration of a spherical segment.

19. The turbine blade as claimed in claim 17, wherein a radius of the circular boundary edge is $\frac{1}{10}$ to $\frac{1}{4}$ of a width of the trailing edge tab, and wherein the depth of the spherical segment is essentially $\frac{1}{3}$ of the sphere radius.

* * * * *